United States Patent
Carr et al.

(10) Patent No.: US 11,526,446 B1
(45) Date of Patent: Dec. 13, 2022

(54) MODIFYING CACHING AMONGST SERVICES FROM A HISTORY OF REQUESTS AND RESPONSES

(71) Applicant: Amazon Technologies, Inc., Seattle, WA (US)

(72) Inventors: Jacob Shannan Carr, Seattle, WA (US); Swapneil Deshmukh, Issaquah, WA (US); Stuart Olmstead-Wilcox, Richmond (CA); Andrew Samnick, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 16/882,298

(22) Filed: May 22, 2020

(51) Int. Cl.
*G06F 12/0815* (2016.01)
*G06F 12/084* (2016.01)
*G06F 9/54* (2006.01)
*G06F 9/451* (2018.01)
*G06F 12/121* (2016.01)

(52) U.S. Cl.
CPC ......... *G06F 12/0815* (2013.01); *G06F 9/451* (2018.02); *G06F 9/54* (2013.01); *G06F 12/084* (2013.01); *G06F 12/121* (2013.01); *G06F 2212/1021* (2013.01)

(58) Field of Classification Search
None
See application file for complete search history.

(56) References Cited

U.S. PATENT DOCUMENTS

| | | |
|---|---|---|
| 8,489,816 B1 | 7/2013 | Reiner et al. |
| 10,152,340 B2 | 12/2018 | Sivathanu et al. |
| 2005/0240732 A1* | 10/2005 | Crick ................... G06F 16/9574 707/E17.12 |
| 2017/0017575 A1* | 1/2017 | Razin ................... G06F 12/0868 |

* cited by examiner

*Primary Examiner* — Syed A Roni
(74) *Attorney, Agent, or Firm* — S. Scott Foster; Kowert, Hood, Munyon, Rankin & Goetzel, P.C.

(57) ABSTRACT

Modifications to caching performed between different services may be determined. A history of requests and responses between the different services may be obtained. The history may be evaluated to determine respective frequencies of parameters between the services. The frequencies of parameters may be evaluated to determine one or more modifications to caching among the different services. The modifications may be provided in order to be applied to change caching performance for subsequent requests.

20 Claims, 10 Drawing Sheets

*caching evaluation user interface 600*

*API detail view 710*

| parameter name | count | current hit rate | max hit rate opportunity |
|---|---|---|---|
| A | 116,217 | 51.636 % | 48.364 % |
| B | 116,031 | 76.256 % | 23.706 % |
| C | 113,075 | 75.892 % | 23.460 % |
| D | 116,031 | 75.894 % | 23.455 % |
| E | 116,217 | 76.519 % | 23.444 % |

*FIG. 7*

MODIFYING CACHING AMONGST SERVICES FROM A HISTORY OF REQUESTS AND RESPONSES

BACKGROUND

Network-based applications are increasingly implemented in complex, widely distributed environments which may rely upon the performance multiple components to handle the capacity of an operation. A network-based service front-end may, for example, leverage a fleet of nodes to handle incoming requests. Various techniques for dispatching requests across nodes may be implemented in order to ensure that requests are handled in a performant fashion.

BRIEF DESCRIPTION OF THE DRAWINGS

FIG. 7 is an example interface for obtaining an API caching analysis result, according to some embodiments.

Figure 1:
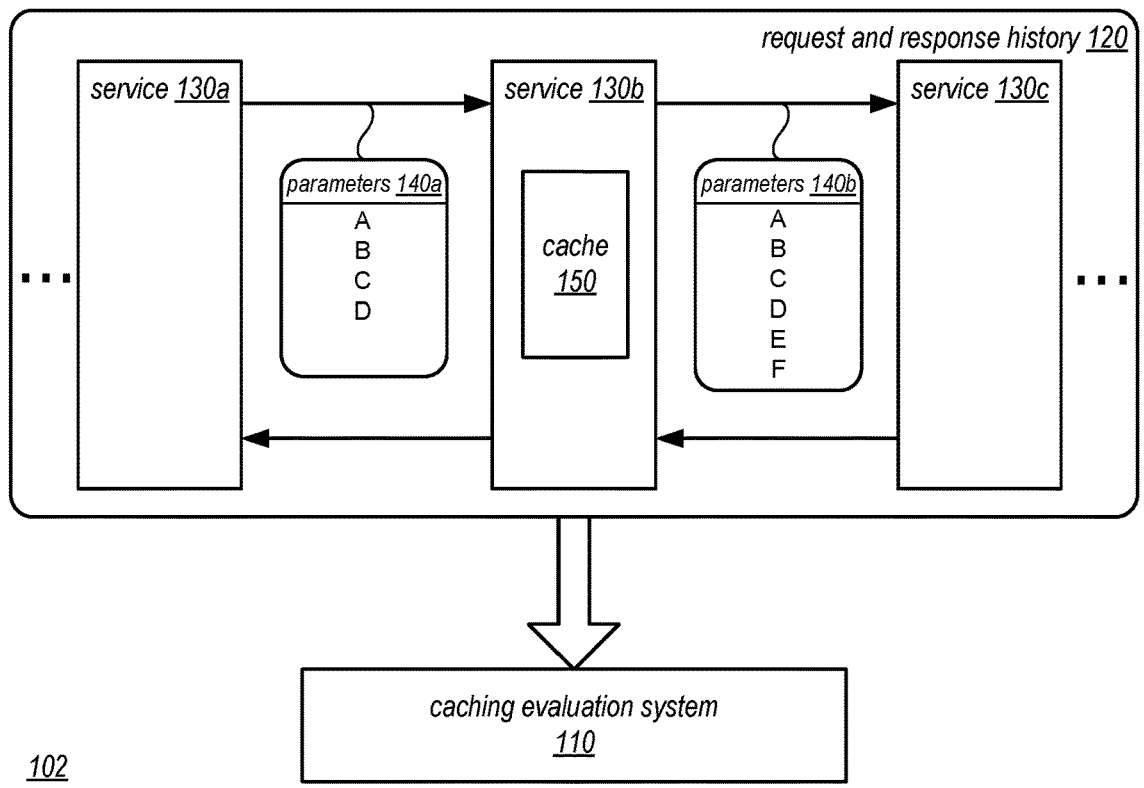
FIG. 1 is a logical block diagram illustrating modifying caching amongst services from a history of requests and responses, according to some embodiments.
Figure 1:
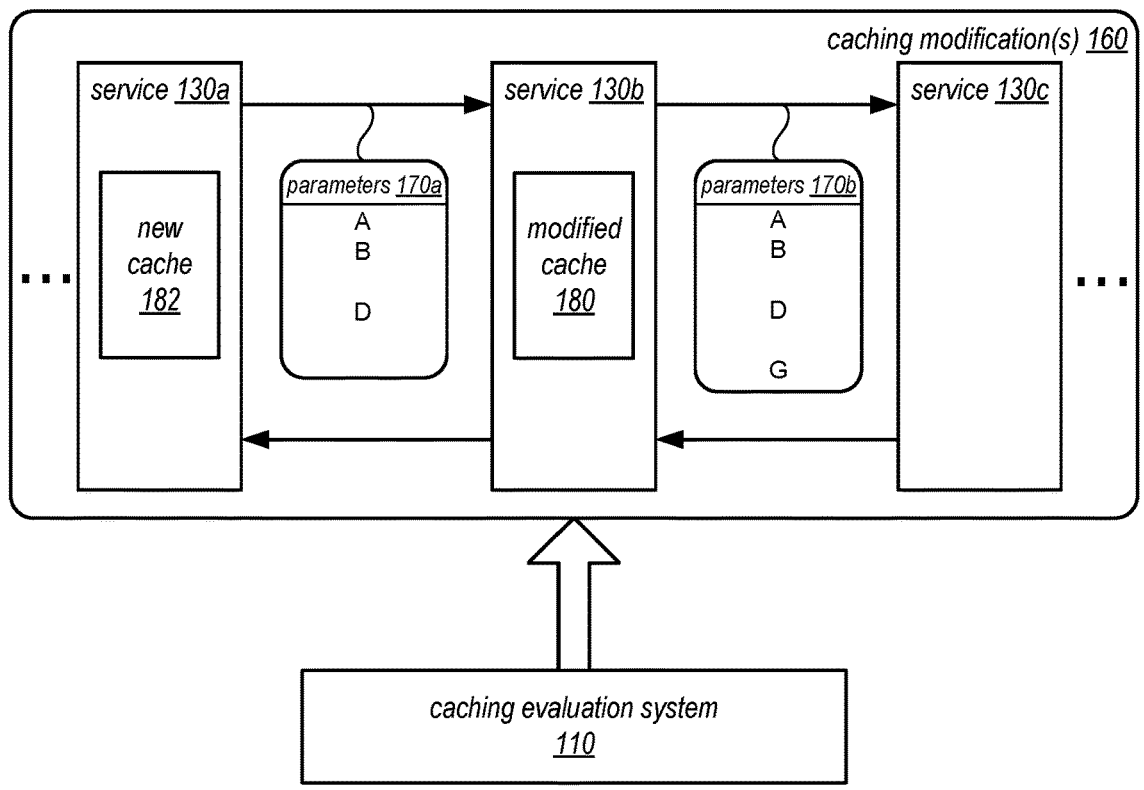

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Techniques to implement modifying caching amongst services from a history of requests and responses are described herein. In various embodiments, different services (e.g., different systems, applications, etc.) may implement an open content strategy to quickly implement new features independently from other services. In various embodiments, an open content data model may be a technique where services (e.g., intermediate services) may not use all the input data to requests (e.g., input parameters to programmatic interfaces such as Application Programming Interface (API) calls or other function, method, or invoked operations), yet pass inbound data along as inputs when making requests to other services. In this way, an open content data model can minimize changes to services in the middle of a call stack when services at the top of the stack need to pass data to services at the bottom of the stack.

Open content data models that proceed independently at different services (e.g., where each service can add, remove, or modify parameters implemented by that service without governance) can create scenarios where forwarded input data may be undesirable. For example, privacy regulations could be potentially violated if services at the top of a stack of services violate data handling standards and send personal identifiable information (PII) data to services at the bottom of the stack. Intermediate services not certified to handle PII data may emit durable artifacts like logs or cache entries. In some scenarios, performance costs of forwarding input data can impact features such as caching. For example, a downstream service that depends on caching for availability may suffer performance loss when input data changes.

As noted earlier, various services may implement caching to more efficiently (cheaper/faster) process reoccurring requests by saving and reusing recent results, in some embodiments. Caching may also reduce load on services deeper in the stack. Some of these services, like databases, may have physical scaling limits, thus placing a ceiling on a service throughput without implementing caching. As different services may change to implement different features, these features may increase the range of possible data values to invoke or respond to requests. The impact of such data value changes on caching can lower hit rates and increase storage requirements (e.g., as caches may have to be keyed differently based on the change to input data).

In various embodiments, modifying caching amongst services from a history of requests and responses may be implemented to improve cache efficiency in scenarios where multiple services exchange requests and responses (e.g., in open data concept models). Request and response history can be analyzed for call patterns to determine modifications such as cache configuration or placement and parameter modification. For example, for requests between services that include the parameter "country" and "delivery address," caching analysis can find that X % of the requests were coming from within the United States, and Y % of them are bound for delivery addresses associated with the United States, Canada, or Mexico. Such an evaluation can show that these parameters can likely to be useful again. If in another scenario, caching analysis demonstrates that X % of requests for the "delivery address" coming from within the same country are for the same address, then data keyed with "delivery address" may not be placed within a cache as it is less likely that such a request will be seen again.

As one skilled in the art will appreciate in light of this disclosure, the examples described above, as well as various other embodiments, may be capable of achieving certain advantages, including some or all of the following, such as improving performance of network services by improving the caching of data used to perform various requests or other operations at the services and improving performance of other applications or systems that depend upon the services to perform various operations. FIG. 1 is a logical block diagram illustrating modifying caching amongst services from a history of requests and responses, according to some embodiments.

In various embodiments, caching evaluation system 110 may be implemented to determine modifications to caching (such as caching at cache 150) for performing requests and responses among a set of services, such as services 130a, 130b, and 130c. As illustrated in scene 102, caching evaluation system 110 may obtain request and response history 120 which may include a description of parameters, such as parameters 140a and 140b, exchanged between services 130 as part of performing requests and responses. As discussed in detail below, request and response history may not be stored or recorded in a format that aids analysis. In some embodiments request and response history 120 may be transformed by caching evaluation system 110 (e.g., changing request and response history from nested data to non-nested data (e.g., relational data format). Caching evaluation system 110 may be implemented as a stand-alone system (e.g., on a single computing system 1000 described below in FIG. 10) or as a distributed service or analysis system, such as discussed below with regard to FIGS. 2-6 (which may be implemented across multiple computing nodes).

Caching evaluation system 110 may receive a request to evaluate caching performance of services 130 and obtain the history 120. As discussed in detail below with regard to FIGS. 3, 5, and 7, caching evaluation system 110 may implement an interface that allows for caching performance evaluations to be requested (e.g., programmatically through an API or user interface). Caching evaluation system 110 may, among other analyses, determine a frequency of parameters in order to determine performance indicators such as cache hit rate, possible maximum caching hit rate, and so on. In at least some embodiments, caching evaluation system may evaluate the effects of possible changes to the caching on parameter frequency in order to measure the positive (or negative) effects of caching modifications that could be provided (as discussed below). For example, a simulation with a caching modification may be applied using the request and response history to rerun the requests and responses. In some embodiments, the possible changes may be suggested by a user (e.g., as specified in a caching evaluation or other request) and/or may be system-specified or default changes that are evaluated.

As illustrated in scene 104, caching evaluation system 110 may provide caching modification(s) 160, in some embodiments. Different types of caching modifications may be made to improve caching amongst services 130. For example, changes to parameters may be recommended, such as indicated at parameters 170a (with parameter "C" removed) and indicated at parameters 170b (with parameter "E" removed and "G" added). Other modifications can include modifying an existing cache, such as modified cache 180 (e.g., changes to caching policies for retaining data, changes to cache size, etc.). Modifications can also include different cache placements, such as new cache 182 and service 130a (or the removal of an existing cache, splitting of an existing cache into multiple locations, etc.). As discussed below with regard to FIGS. 4, 5, and 8, the modifications may be automatically performed in some embodiments (e.g., based on modification type and/or permission). In other embodiments, modifications may be recommended and implemented by users of caching evaluation system 110.

Services 130 may be various kinds of public (or private) systems, applications, or other services. In various embodiments, services may be network-based, receiving requests to perform operations over a network. In various embodiments, different services may operate together to perform various aspects of a client request, such as transfers content using an authorization service to verify client identity and permissions, a content catalog service to identify storage locations(s) for the request content, a content distribution service to deliver the content, and/or various other services. As discussed above, in at least some embodiments these services 130 may implement an open data model that allows for one service to pass through or forward parameters received from another service (even though that input data may (or may not) be used by the service) before passing through or forwarding the parameters as a request to another service.

Parameters, such as parameters 140a, 140b, 170a, and 170b, may be various forms of input or other data used to perform requests, responses, and/or operations invoked by the requests or responses.

Please note that previous descriptions are not intended to be limiting, but are merely provided as examples of the illustrated features. Various other implementations of these features, such as other types of services that implement caching and caching evaluation systems, including those discussed below, may implement the techniques discussed above.

This specification next includes a general description of a provider network, which may include a service that implements resilient consistent hashing for a distributed cache. Then various examples of the service are discussed, including different components, or arrangements of components that may be employed as part of implementing the service. A number of different methods and techniques to implement resilient consistent hashing for a distributed cache are then discussed, some of which are illustrated in accompanying flowcharts. Finally, a description of an example computing system upon which the various components, systems, devices, and/or nodes may be implemented is provided. Various examples are provided throughout the specification.

Figure 2:
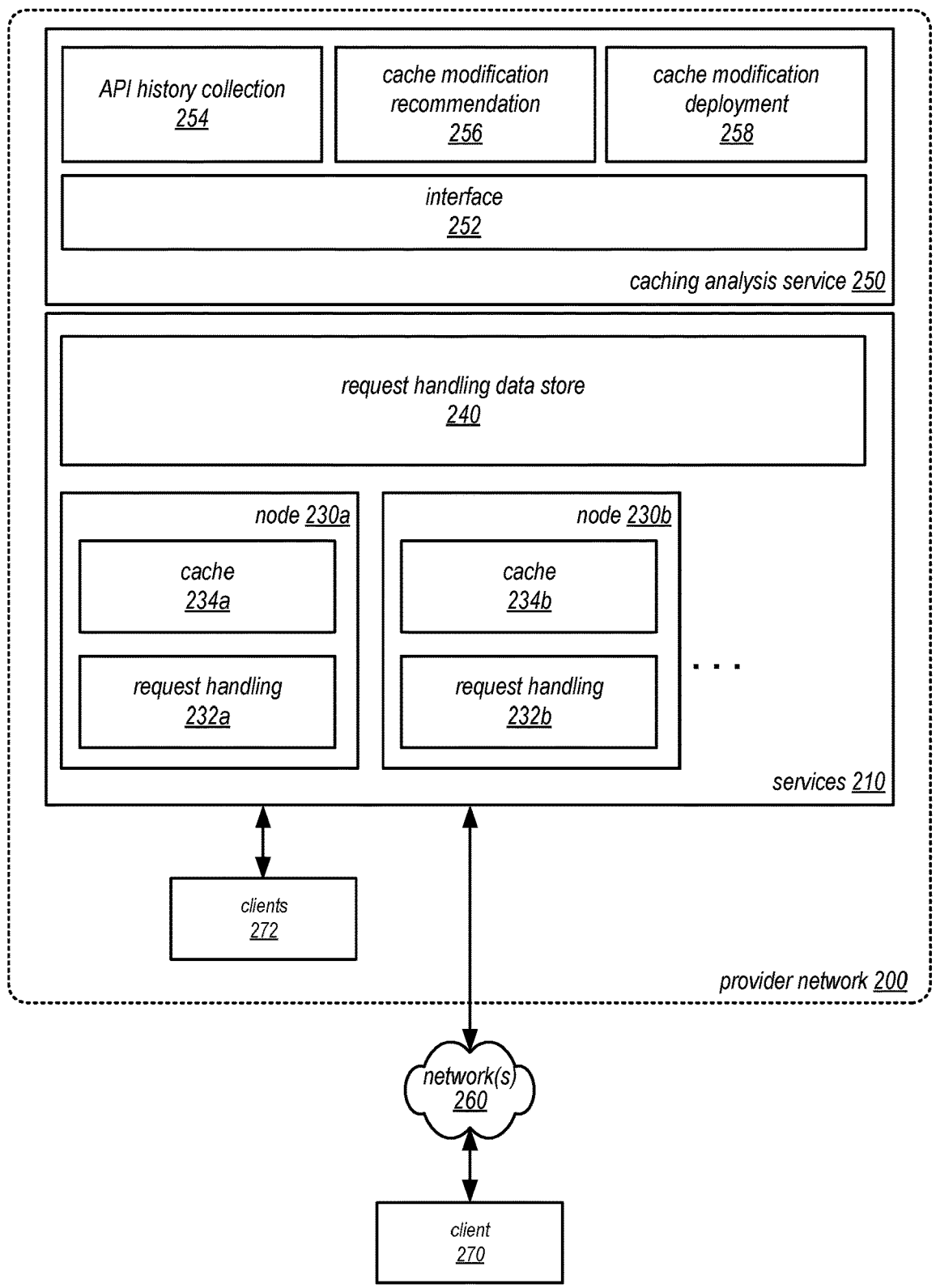
FIG. 2 is a logical block diagram illustrating a provider network that includes multiple services and a caching evaluation service that determines modifications to caching amongst services from a history of requests and responses, according to some embodiments.

FIG. 2 is a logical block diagram illustrating a provider network that includes multiple services and a caching evaluation service that determines modifications to caching amongst services from a history of requests and responses, according to some embodiments. Provider network 200 may be a private or closed system or may be set up by an entity such as a company or a public sector organization to provide one or more services (such as various types of cloud-based storage, cloud-based commerce, transaction, or fulfillment services) accessible via the Internet and/or other networks to clients. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200.

In some embodiments, provider network 200 may implement services 210, such as database services, (e.g., a data warehouse service, relational database services, non-relational database services (e.g., NoSQL) and other database services), data processing services (e.g., a map reduce service, virtual compute services or event-driven compute services), transaction services, commerce services, and data storage services (e.g., object storage services or block-based storage services that may implement a centralized data store for various types of data), and/or any other type of network based services (which may various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below (e.g., a host server that implements one (or more) nodes of a service). In various embodiments, the functionality of a given system or service component (e.g., a component of service 210) may be implemented by a particular node or may be distributed across several nodes. In some embodiments, a given node may implement the functionality of more than one service system component (e.g., more than one control plane component).

In various embodiments, services 210 may implement multiple nodes (e.g., a fleet of nodes) to handle various requests, such as nodes 230a and 230b. These nodes may perform various requests submitted by clients of services 210, including requests for data or requests to perform operations. Nodes 230 may implement request handling, such as request handling 232a and 232b respectively. Request handling 232 may utilize data to perform a request, such as the context or other information to configure an operation (e.g., parameter values). In some embodiments, the request may be for data itself. Nodes 230a may obtain the data from a back-end service or storage system, such as request handling data store 240.

As services 210, may be implemented as large scale services handling high volumes of requests (e.g., thousands or millions of requests) and/or managing high numbers of resources (e.g., thousands or millions of databases, compute instances, or other computing resources offered by services 210), caching information to perform requests may significantly reduce the latency or time to complete a request (in addition to costs to obtain information from request handling data store 240). To improve performance, nodes 230 may also implement a cache (e.g., in a memory or other high-speed storage device), such as caches 234a and 234b. Caches 234 may store frequently or recently accessed data, in order to avoid having to obtain the data from request handling data store 240.

Request handling 232 may access a cache 234 first in order to determine whether the request can be served using cached data. If not, then the node may obtain the data from request handling data store 240 (and may put the data in cache 234). As discussed above with regard to FIG. 1, different services 210 may invoke, forward, interact with, or otherwise request (e.g., via a remote procedure call) another service to perform an operation as part of handling a received request. Request handling 232 may forward, pass through, or otherwise include in sent requests the parameters received. Nodes 230 (or other component of services 210 may track (e.g., by storing log records in a log) of the requests and responses received including the parameters, which can be obtained by API history collection 254, in some embodiments. Note that although nodes 230a are implemented as implementing a cache, some services may not implement caching as part of request handling.

Provider network 200 may implement caching analysis service 250, in some embodiments. In some embodiments, caching analysis service 250 may be implemented separately from provider network 200 (as part of a stand-alone diagnostic tool), in some embodiments. As discussed in detail with regard to FIGS. 3-6, caching analysis service 250 may implement caching performance analysis and modifications based on the analysis in order to improve caching for requests and responses between services 210. Caching may be improved in terms of caching performance (e.g., higher hit rates or other utilization) and/or caching accuracy (e.g., correctness of cached values). For example, interface 252 may support a programmatic, command line, and/or graphical user interface for request caching performance evaluations and obtaining recommendations for modification. API history collection 254 may be implemented as part of caching analysis service 250 in order to obtain request and response history for APIs between services 210 for evaluation, in some embodiments. Cache modification recommendation 256 may be implemented as part of caching analysis service 250, in some embodiments, to evaluate the history of requests and responses to determine parameter for frequency. Parameter frequency can be used to identify caching modifications, such as cache placements, cache configuration, and/or parameter changes. Cache modification deployment 258 may be implemented to automatically perform cache modifications as part of caching analysis service 250, in some embodiments.

Clients 270 of provider network 200 may encompass any type of client configurable to submit requests to provider network 200. For example, a client 270 may include a suitable version of a web browser, or may include a plug-in module or other type of code module configured to execute as an extension to or within an execution environment provided by a web browser, or another client application (e.g., an application hosted in another provider network or private network) that uses or is dependent upon communications sent to some resource provider network 200, such as a web application (or user interface thereof) that initiates a transaction or utilizes a provider network resource or application, such as a media application, an office application or any other application that may make use of various provider network resources, including to perform various operations. In some embodiments, such an application may include sufficient protocol support (e.g., for DNS protocol or for a suitable version of Hypertext Transfer Protocol (HTTP)) for generating and processing network-based services requests. In some embodiments, clients 270 may be configured to generate network-based services requests according to a Representational State Transfer (REST)-style network-based services architecture, a document- or message-based network-based services architecture, or another suitable network-based services architecture. In some embodiments, a client 270 may be configured to provide access to a control plane to manage resources. Clients may be associated with particular user accounts, user identifiers, or other information which may indicate the access rights, resources, and other associated information maintained at provider network 200 that implements resources in multi-tenant fashion on behalf of a client. In some embodiments, sources and destinations of a communication (e.g., a client and application) of may be both implemented within provider network 200 (e.g., an object storage service of provider network 200 may utilize a data processing service to format data before storage within the object storage service) to implement various service features or functions and thus various features of clients discussed above may be applicable to such internal clients 272 as well.

Clients may convey network-based services requests to provider network 200 via network(s) 260. In various embodiments, network(s) 260 may encompass any suitable combination of networking hardware and protocols necessary to establish network-based communications between clients 270 and provider network 200. For example, network(s) 260 may generally encompass the various telecommunications networks and service providers that collectively implement the Internet. A network(s) 260 may also include private networks such as local area networks (LANs) or wide area networks (WANs) as well as public or private wireless networks. For example, both a client 270 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and provider network 200. It is noted that in some embodiments, clients may communicate with provider network 200 using a private network rather than the public Internet.

Figure 3:
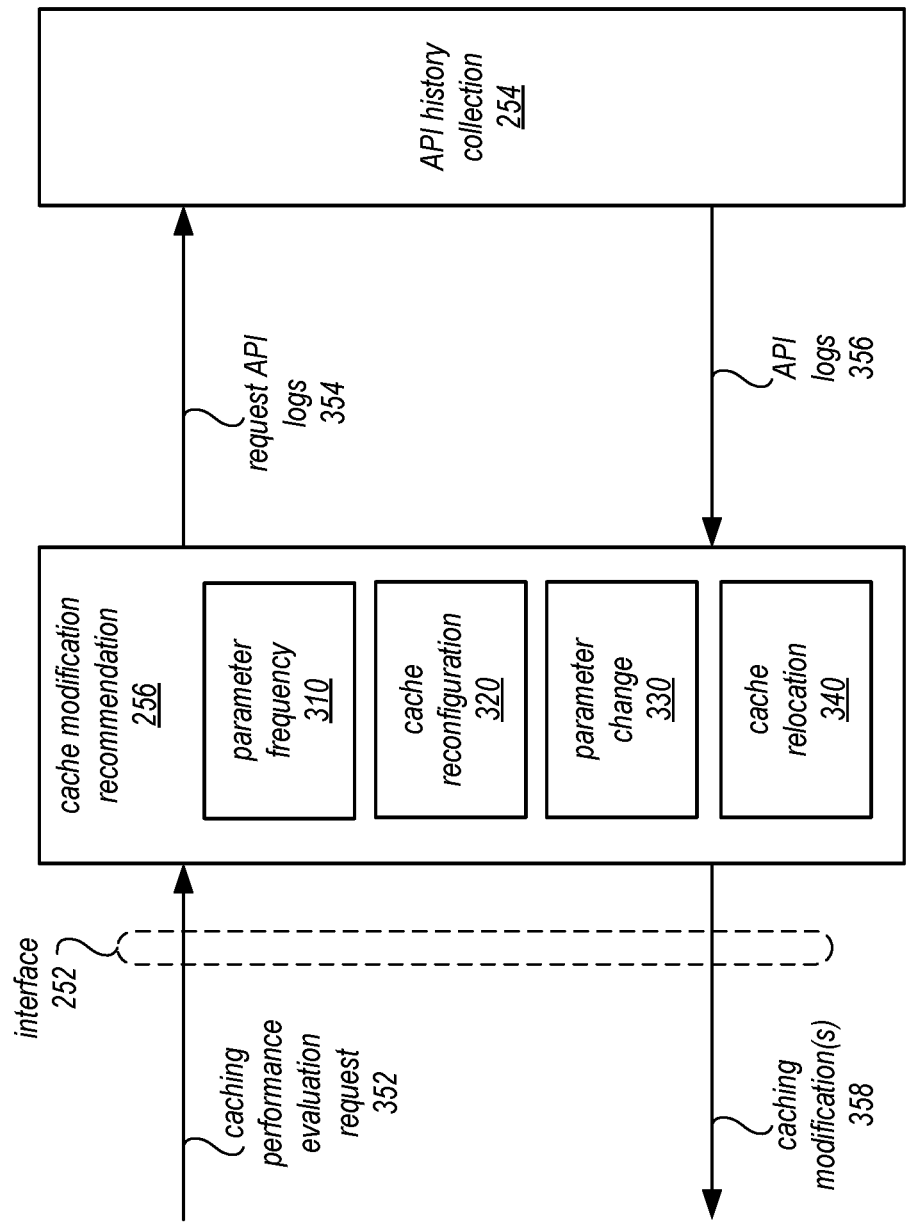
FIG. 3 is a logical block diagram illustrating interactions to determine caching modifications from Application Programming Interface (API) history, according to some embodiments.

FIG. 3 is a logical block diagram illustrating interactions to provide updates to a consistent hashing scheme to clients, according to some embodiments. Cache modification recommendation 256 may support both manual and automated caching performance evaluations, in some embodiments. Request 352 for caching performance evaluation may, for instance, be implemented as an API request which may be sent by a client service (or group of services) or other caching analysis service component (e.g., API history collection) in response to storing, record, or otherwise providing a history of API calls and responses for evaluation, in some embodiments. In some embodiments, request 352 may be received via GUI, as discussed below with regard to FIG. 6.

Request 352 may specify various aspects of the analysis and/or modifications to be considered, in some embodiments. For example, request 352 may identify a log file, or other history file. In some embodiments, request 352 may identify a service stack or other grouping of service API history. Request 352 may, in some embodiments, request evaluation for parameter changes alone, caching configuration changes alone, caching placement changes alone, or some combination of one or more of the various types of modification, in some embodiments.

Cache modification recommendation 256 may obtain the history of requests and responses in order to perform modification analysis. For example, as indicated at 354, cache modification recommendation 256 may request API logs for a service stack or other identified file or group of services, in some embodiments. API history collection 254 may proactively obtain log information, in some embodiments and thus may already have the requested API logs. For instance, API history collection may poll various services for API request and response information in order to generate an API log. In some embodiments, API history collection may be the recipient of log records pushed to API history collection 254, which may store the log records in a file, structure, or data store for a specified service stack (or other group of services). In some embodiments, API history collection 254 may obtain API logs in response to request 354. For instance, API history may obtain, read, copy, or transfer a log file identified in caching performance request 352, in some embodiments. API history collection 254 may, in some embodiments, do various forms of pre-processing to ready logs for analysis (e.g., change/convert format, remove extraneous data, and so on). API history collection 254 may provide API logs 356 to cache modification recommendation 256.

In some embodiments, API history collection 254 may transform history into a standard format, which can then be used for analysis at cache modification recommendation 256. For example, API history collection 254 can transform data from document formats (or other nested structures) into a format that maps request and response features like date/time, client, service, operation, input parameters, and output parameters. In some embodiments, format translation and/or other data modification operations may be performed as part of parameter frequency determinations, as discussed below at 310.

Figure 8:
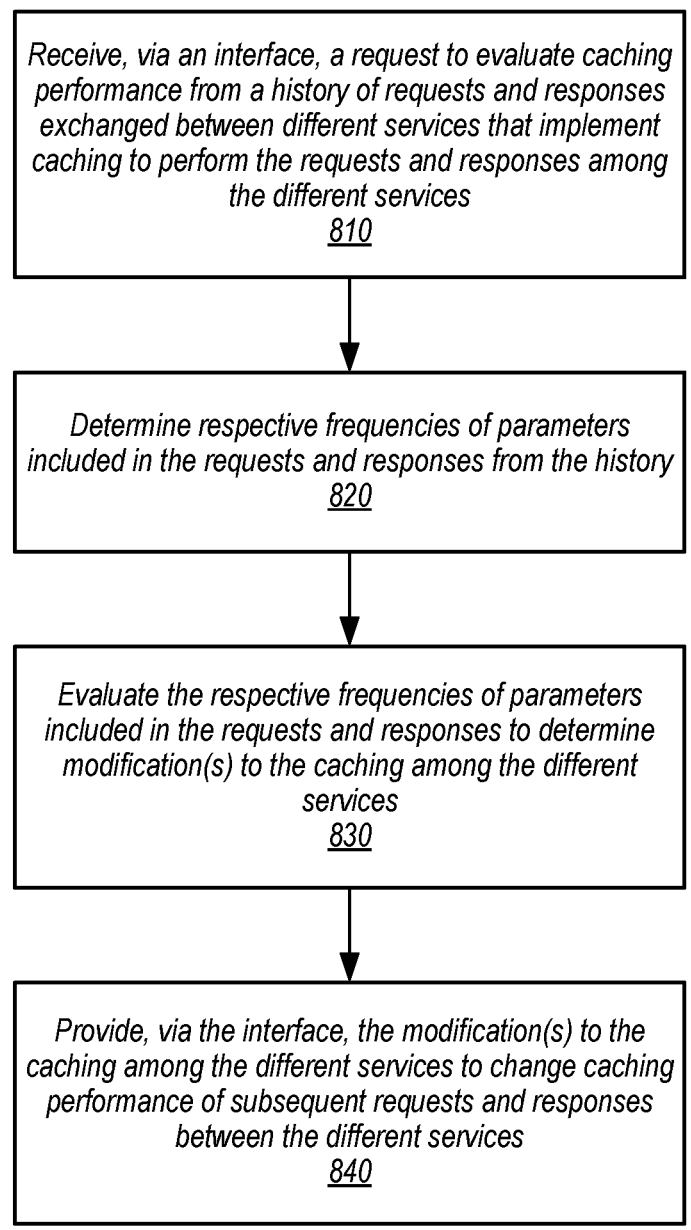
FIG. 8 is a high-level flowchart illustrating various methods and techniques for determining a modification to caching amongst services from a history of requests and responses, according to some embodiments.

Cache modification recommendation 256 may implement parameter frequency 310, in some embodiments to determine parameter frequency in responses, in some embodiments, as also discussed below with regard to FIG. 8. For example, parameter frequency 310 may implement a recursive technique for each parameter. Log records or other history information may be formatted as a composite data type (e.g., a struct). In some instances, parameters may not impact output. Such non-impactful parameters may be identified (e.g., by counting to see if they are forwarded (or not)). In some embodiments, a table may be created that includes columns such as client name, service name, API name, API input and API output. The history information in the table may then be sorted (e.g., sorting the structs in API input and API output).

In various embodiments, a low-fidelity frequency count sum may be implemented to determine parameter frequency. For example, a name value table may be created, such as:

TABLE 1

| Name | Value |
|---|---|
| country_of_residence | United States |
| country_of_residence | United States |
| country_of_residence | United States |
| country_of_residence | Canada |
| country_of_residence | Mexico |

The number of times a parameter value was used may be determined. For instance, an example Structured Query Language (SQL) statement to determine the number may be:

SELECT
  depth,
  name,
  value,
  COUNT(1) AS bucket
WHERE
  name IS NOT NULL AND value IS NOT NULL
GROUP BY
  depth
  name
  value
ORDER BY
  depth,
  name,
  bucket An example output of the above example SQL may be:

TABLE 2

| Name | Value | Bucket |
| --- | --- | --- |
| country_of_residence | United States | 3 |
| country_of_residence | Canada | 1 |
| country_of_residence | Mexico | 1 |

A determination may be made, in some embodiments, for each parameter name, how many times a specific value was used a specific number of times. An example SQL statement could be:
SELECT
  depth,
  name,
  bucket,
  COUNT(1) AS amount
GROUP BY
  depth
  name
  bucket
ORDER BY
  depth,
  name,
  bucket An example output generated by the example SQL may be:

TABLE 3

| Name | Bucket | Sum Bucket |
| --- | --- | --- |
| country_of_residence | 3 | 1 |
| country_of_residence | 1 | 2 |

The low fidelity frequency count sum can then be created. For instance, an example SQL statement could be:
SELECT
  name,
  bucket,
  2^(int) log 2(sum bucket) AS low_fidelity_sum_bucket
FROM
  depth
  name
  bucket
ORDER BY
  depth,
  name,
  bucket Representations can be generated by parameter frequency 310 for analysis, such as histograms (e.g., from the low fidelity frequency count), in some embodiments. For instance, a log-base 10 scale for both the x and y axis of a histogram may be used.

In some embodiments, non-recursive techniques to determine the frequency and thus the cacheability of parameters of an API (or other request/response) may be implemented. For example, a parser or component may scan API log records into a temporary table with a single column. In some embodiments, the temporary table may be in a column oriented file format (e.g., Parquet). When a log record is scanned, a count for each column name specified in the record is incremented. Then the record is stored in a string format as a new record in the temporary table. A second table may then be created using the column names discovered in the previous scan as respective different columns in the second table. In some embodiments, each column may be a string and nullable data type. The first, previously created single-column table may then be read. Each string record may be separated into the respective column (or null) values in the second table.

The second table may then be queried to create a frequency count. For example, a SQL command to create this frequency could be:
SELECT '% s' AS name, % s AS value, COUNT(1) as bucket
FROM the_second_table
WHERE % s iS NOT NULL
GROUP BY % s As with the recursive technique above, a histogram may be generated for frequency, in some embodiments. For example, a log-base 2 bucket may be used to graph on a log-base 10 scale for both the x and y axis of a histogram may be used.

Note that the above techniques were given as examples of frequency determinations for parameters. Other techniques to count, scan, or otherwise determine the frequency of parameters in API logs may be implemented in other embodiments. Frequencies may, in some embodiments, be represented as percentages that indicate the best-case current hit rate for a parameter in a cache. For instance, if a parameter occurs with 60% frequency in a request/response, then at best 60% of requests/responses with that parameter keyed to a cache may hit. The remaining difference between the percentage frequency (e.g., 40%) may represent an opportunity percentage for increasing the hit rate of the request/response.

In various embodiments, cache recommendation modification 256 may identify various cache change modifications, such as cache reconfiguration 320, parameter change 330, and cache relocation 340. In some embodiments, these modification analyses may be performed according to specific request (e.g. 352). For example, cache reconfiguration 320 may simulate the effect of Time-to-Live (TTL) changes on cache policies for one or more caches between services. Various other changes may be simulated for the different analyses, and thus, the previous examples are not intended to be limiting.

As caches may be more efficiently used when more frequently seen data is cached (and thus usable instead of returning to a source for the data), the frequency of parameter data may be used to perform various types of caching modification analyses. Cache modification recommendation 256 may implement cache reconfiguration 320, in some embodiments, as one type of modification analyses. Cache reconfiguration 320 may be able to make modifications to the size and/or other policy attributes of an existing cache in order to increase hit rates on the cache. For example, cache reconfiguration 320 may identify a less frequently repeated parameter (e.g., above some threshold frequency) that could result in better cache hit rates if, for instance, the retention policy or size of the cache were increase.

Another modification analysis that cache modification recommendation 256 may implement is parameter change 330. Parameter change analysis 330 may determine which parameter inputs may have low hit rates (e.g., low cacheability). A parameter with a frequency rate below a threshold amount may be identified as a parameter that should not be included or forwarded in an API call, for example. In some embodiments, parameter change 330 may identify one (or a combination of) parameters to replace an identified parameter for removal (e.g., parameters D and E would together increase cache hit rate if parameter C were removed). Such analyses may be made be generating a hypothetical frequency analysis with the identified parameter removed (and in the cases of adding parameters, the identified parameter(s) to add, added).

In some embodiments, parameter change 330 may consider evaluating unnecessary information in cache keys. For example, a cache key could be specified as pair of values "{a:1, b:2}" or as "{b:2, a:1}." As caches may be keyed by strings the two value pairs would point to two different entries-even though the parameter values are the same, just in different order). Therefore parameter change analysis 330 can identify information to remove/modify so that such cache keys point to the same location (e.g., have values ordered in the same way).

In some embodiments, parameter change 330 may identify features where precision in parameter values is reducing cacheability. For example, a location value specified by latitude/longitude pairs could be translated into a coarser value (e.g., postal code). Similarly, time values could have precision reduced (e.g., from high precision to rounding time values to an hour), in another example.

Another modification analysis that may be implemented is cache relocation 340. In some embodiments, cache placement may not provide for optimal cache hits. If, for instance, a parameter with a high frequency is not cached at a service in a service stack, then a cache with parameter could be identified for that service. In some embodiments, an existing cache could be identified for splitting to other locations with different cache keys (e.g., parameters that are index values to the cache), with at least one of the split caches moving to a different service in the service stack. As discussed below with regard to FIG. 5, some cache relocations may not be from one service to another (or one service boundary to another), but could be a cache relocation within a service.

Figure 4:
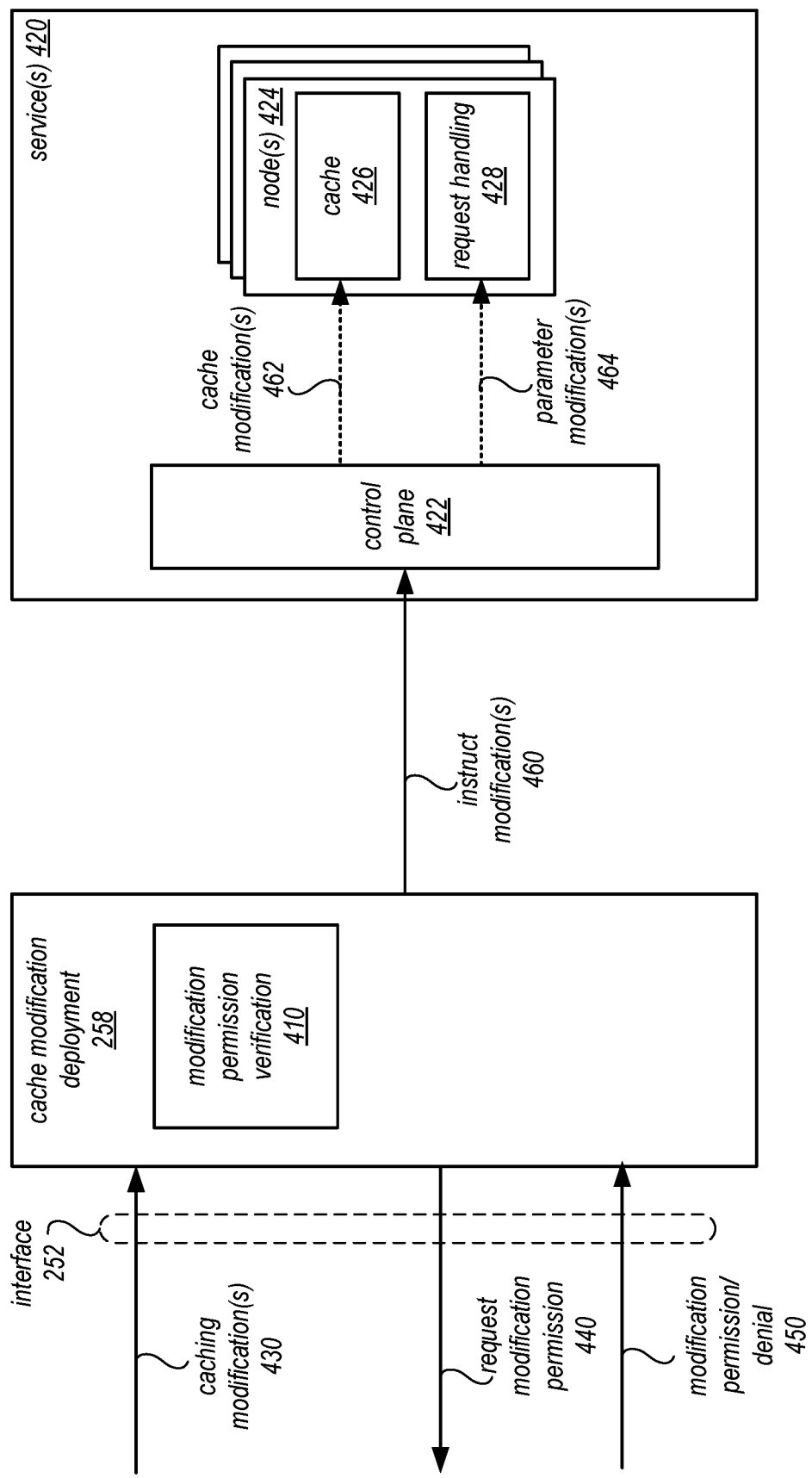
FIG. 4 is a logical block diagram illustrating automated modification of caching amongst services determined from API history, according to some embodiments.

Caching modifications 358 may be returned via interface 252. These modifications may be provided for users to manually implement. In some embodiments, caching modifications may be automatically implemented. FIG. 4 is a logical block diagram illustrating automated modification of caching amongst services determined from API history, according to some embodiments.

Cache modification deployment 258 may be implemented to determine and/or direct the performance of identified cache modifications, in some embodiments. Cache modification deployment 258 may, for instance, implement various ones of the techniques discussed below with regard to FIG. 9. Cache modification deployment 258 may receive caching modification(s) 430 directly from cache modification recommendation 258 or from a user (e.g., confirming or request the caching modifications via an interface, such as interface 252). Cache modification deployment 258 may implement modification permission verification 410, in some embodiments. Modification permission verification 410 may determine whether a requested modification has permission to be performed. In some embodiments, a request for modification permission 440 may be sent via interface 252. Modification permission or denial 450 may be received back via interface 252, in some embodiments. Cache modification deployment 258 may implement modification type limitations, in some embodiments. For instance cache modifications may be implemented to caching policy changes as opposed to different cache locations, in some embodiments (although in other embodiments different modification type limitations may be imposed). In some embodiments, modification permission can be granted in a request to evaluate (e.g., request 352 in FIG. 3) as long as a modification were within some allowed range of change.

Cache modification deployment 258 may implement various interfaces, support various protocols, or execute scripts instructions (e.g., which may be user-provided) or other instructions to direct or cause caching modifications to be performed. Some services may allow for direct contact with resources implementing the caching (e.g., nodes or other request handlers). As illustrated in FIG. 4, in some embodiments, services, such as service(s) 420, may implement a control plane 422 for handling management or other requests, including request to cause caching modifications. Cache modification deployment 258 may, for instance, send or other instruction modification(s) 460 to control plane 422 (which may implement a programmatic interface, such as an API, and/or allow for executable, scripts, or other forms of instructions to be specified).

Control plane 422 may perform the instructed modifications on the appropriate components, such as node(s) 424. For example, cache modifications 462 may be made to cache 426 (e.g., changing caching policies (e.g., size or retention time, eviction policy, etc.). In another example, parameter modification(s) 464 may be made to request handling 428 to, for instance, indicate parameters to remove and/or include in requests when forwarding or invoking further services.

Figure 5:
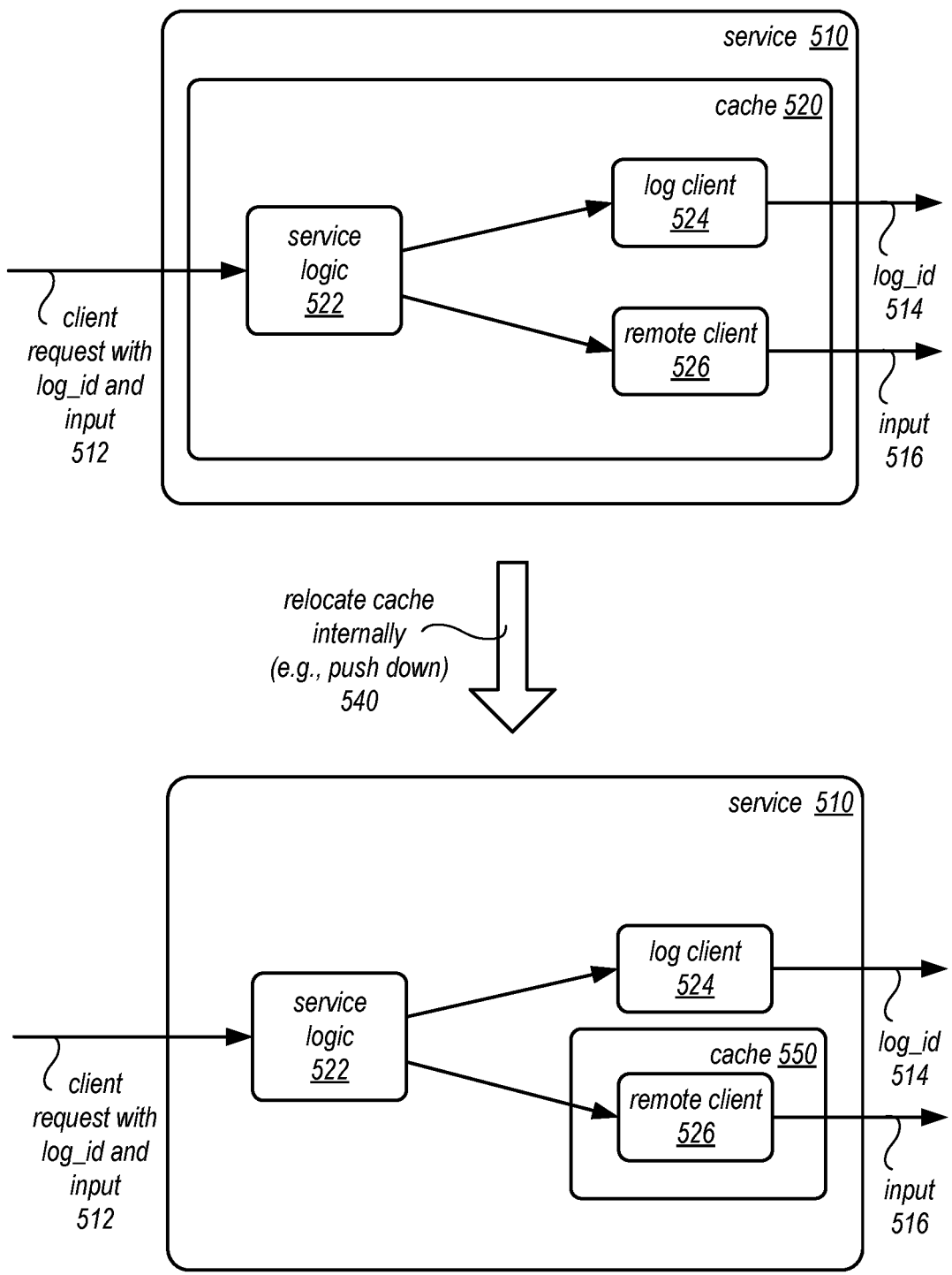
FIG. 5 is a logical block diagram of a caching modification, according to some embodiments.

As discussed above, various types of caching modifications may be evaluated, identified, and/or recommended. Caching modifications can be modifications to caches that are placed along the boundaries of a service (e.g., a cache that uses as a cache key the input to the service. For example, FIG. 5 is a logical block diagram of a caching modification, according to some embodiments. Service 510 may implement cache 620 at the service boundary for request 612 so that cache key is "input" and "log_id" and the cache is then used for service logic 620, log client 624 send a request to a log service using "log id," as indicated at 614, and remote client 626 send a request to another remote service using "input," as indicated at 616. A cache relocation modification as indicated at 540 to push down the cache can be implemented, in some embodiments, which may a cache reconfiguration to change from an externally located cache to an internally located cache, such as cache 550. Because cache 550 may just use "input" as a cache key (instead of also using "log id"), that the cache hit rate can be improved (e.g., as "log id" may be unique or frequently changing values).

Figure 6:
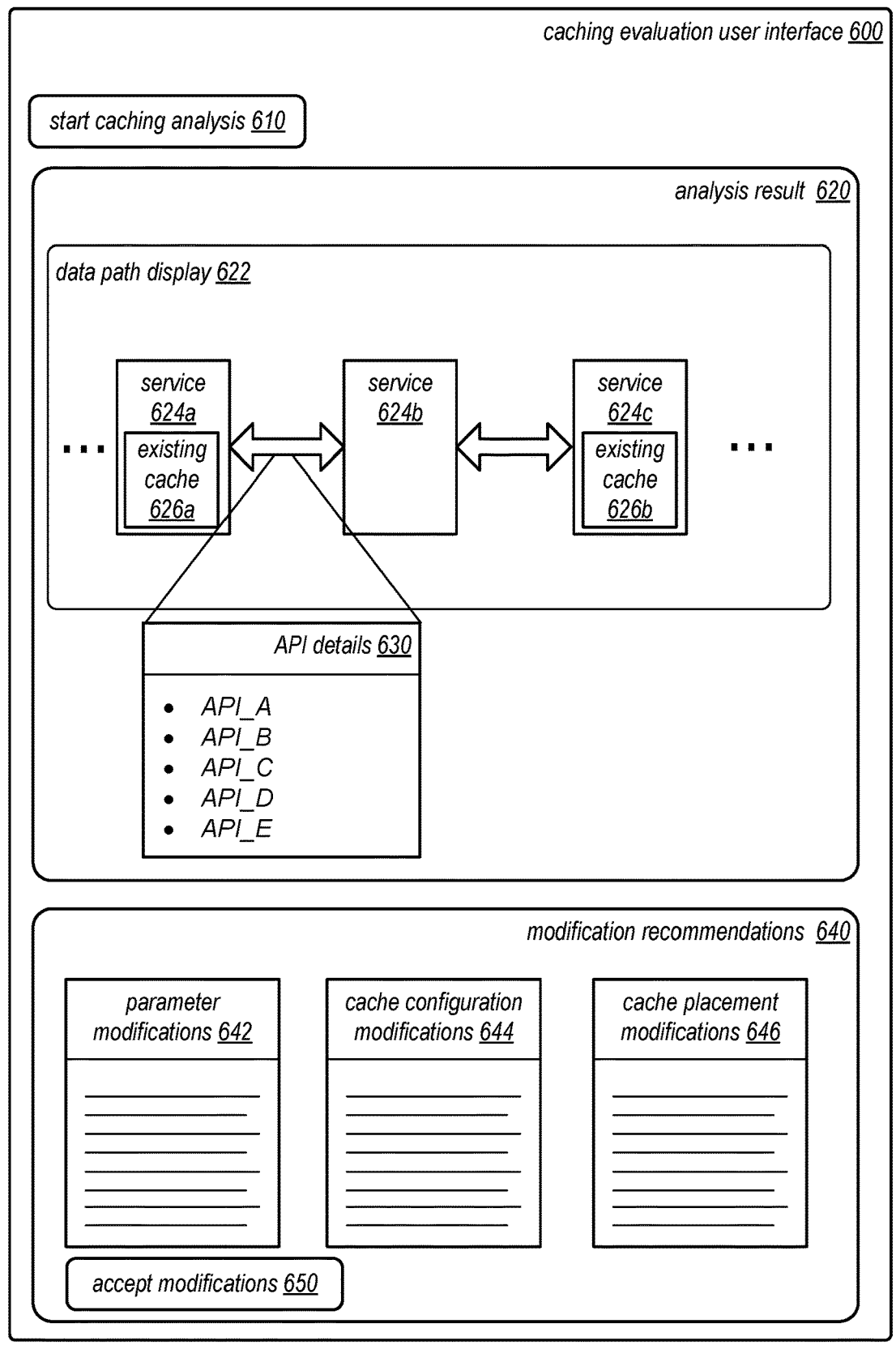
FIG. 6 is an example interface for obtaining a caching analysis result, according to some embodiments.

Caching evaluation systems, like caching analysis service 250, may utilize various kinds of interfaces to support different analysis and modifications for caching based on evaluations of request and response history among services. FIG. 6 is an example interface for obtaining a caching analysis result, according to some embodiments. Note that both FIG. 6 and FIG. 6 discussed below are just examples of GUIs. Various other types or formats of interfaces, including other GUIs may be implemented in other embodiments.

Caching evaluation user interface 600 may implement one or more graphical user interface elements (e.g., dropdown menus, buttons, pop-up windows, wizards or series of user interface elements) to start a caching analysis, as indicated at 610. For example, starting caching analysis 610 may open an upload mechanism or provide an input to identify the location of a log or other history file for analysis. In some embodiments, analysis configuration information may be input, such as the location and configuration of existing caches. Features of the analysis, such as which types of modifications can be performed or recommended may also be specified.

Caching evaluation user interface 600 may display an analysis result 620, in some embodiments. Analysis result 620 may include a data path display 622, in some embodiments, to visualize the different services of a service stack as well as existing caches, such as services 624*a*, 624*b*, and 624*c* and existing caches 626*a* and 626*b*. Various features of the display 622 may be selectable. For instance, an existing cache 626 may be selected to display caching policies or other configuration information for the cache used in the analysis. As depicted in FIG. 6, a selected interaction between service 624*a* and 624*b* may be selected to depict the API details 630 of the information exchanged between the services. APIs may be ordered, highlighted or otherwise described to indicate priority or high value modifications that can be made, in some embodiments.

Further detailed information for individual APIs may be provided. For instance, one of the APIs in API details 630 may be selected which may trigger the display of a detailed view for that API. FIG. 7 is an example interface for obtaining an API caching analysis result, according to some embodiments. Caching evaluation user interface 600 may, for instance, include in API detail view 710 various descriptive information about the parameters used in the analysis (e.g., to support a user's own separate analysis). For example, the parameter name, count of occurrences, current hit rate (determined from frequency), as well as remaining opportunity to maximize hit rate, may be displayed.

Returning to FIG. 6, caching evaluation user interface 600 may include modification recommendations 640, in some embodiments. For example, modification recommendations 640 may include various types of modifications, such as parameter modifications 642, cache configuration modifications 644, and/or cache placement modifications 646. Each user interface element (e.g., 642, 644, and 646) for modifications may be selectable to display more detailed modification information, in some embodiments. To grant permission to perform one, some, or all modifications recommended, a user interface element to accept modifications 650 may be implemented, in some embodiments.

The examples of determining a modification to caching amongst services from a history of requests and responses as discussed above with regard to FIGS. 2-7 have been given in regard to a service offered by a provider network. Various other types systems or configurations of services and/or caching evaluation systems may implement these techniques. FIG. 8 for determining a modification to caching amongst services from a history of requests and responses, according to some embodiments. Various ones of the systems described above may implement some or all of these techniques, as well as other systems not illustrated above.

As indicated at 810, a request to evaluate caching performance from a history of requests and responses exchanged between different services that implement caching to perform the requests and responses among the different services may be received via an interface, in some embodiments. As noted above, the request may be received via different types of interfaces, such as programmatic, command line, GUI, and so on, in some embodiments. The request may specify various information to perform the evaluation, such as information about the services (e.g., which services interact with other services, which services implement a cache, what is the caching policy of the cache, etc.), in some embodiments. The request may specify which types of recommendations that can be performed (e.g., cache placement, cache configuration, and/or parameter changes), in some embodiments. The request may specify possible modifications to simulate, in some embodiments. The request may specify permission to perform modifications, in some embodiments (e.g., within a specified range of possible changes, such as a TTL range for cache configuration changes).

As indicated at 820, respective frequencies of parameters included in the requests and responses may be determined from the history, in some embodiments. For example, an intersection may be determined for those parameters that are input and output of a service to determine a frequency of parameters. As discussed above with regard to FIG. 3, various recursive or non-recursive techniques may be implemented to calculate frequency values for different respective APIs. Other frequency calculation techniques may be implemented, such as implementing hash tables indexed to different parameter buckets with counts that are incremented when found in a history may be determined, in some embodiments. As discussed above with regard to FIGS. 2 and 3, in some embodiments, various other transformations to perform translation of history information into a standardized schema or un-nesting request data may be performed.

As indicated at 830, the respective frequencies of parameters included in the requests and responses may be evaluated to determine modification(s) to caching among the different services, in some embodiments. For example, different types of modifications, cache configuration, cache location, and/or parameter modification may have different respective criteria for determining whether to modify and how to modify. Threshold frequencies for changing cache size or retention policy may be implemented, whereas different threshold frequencies for removing a parameter may be implemented, in some embodiments. For instance, as discussed above with regard to FIG. 3, cache reconfiguration may identify a less frequently repeated parameter (e.g., above some threshold frequency) that could result in better cache hit rates if, for instance, the retention policy or size of the cache were increase. Another types of analysis may include simulating a frequency analysis with the identified parameter removed (and in the cases of adding parameters, the identified parameter(s) to add, added), in some embodiments.

As indicated at 840, the determined modification(s) to the caching among the different services to change caching performance of subsequent requests and responses between the different services may be provided via the interface, in some embodiments. For example, a GUI may illustrate locations in a data path view that identify where and what modifications may be made. In some embodiments, a recommendation document (e.g., a text file, JSON, HTML, or other human readable script) may be generated and sent which indicates the modifications. In some embodiments, the recommendations may include scripts, code, or other information to apply the recommended modifications manually.

Figure 9:
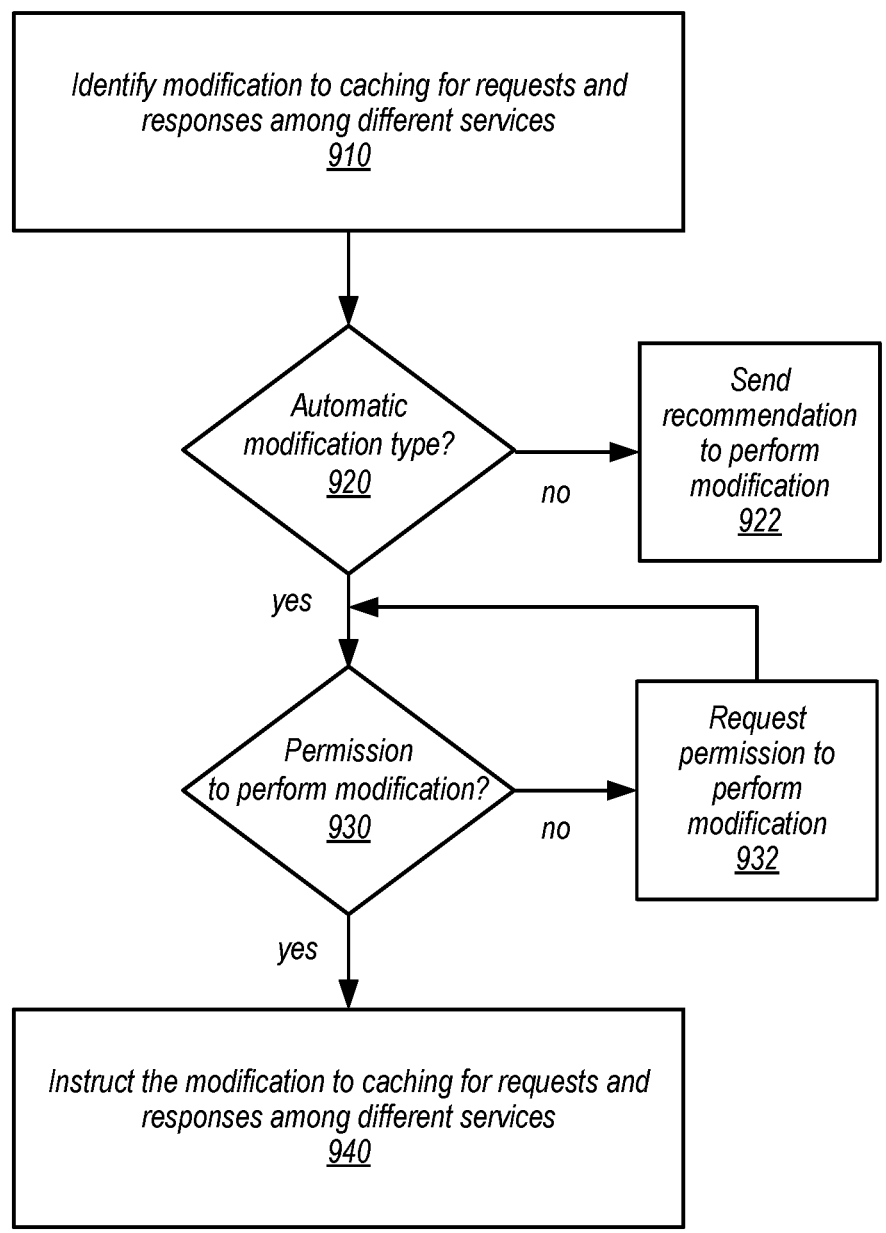
FIG. 9 is a high-level flowchart illustrating various methods and techniques for performing automated caching modifications, according to some embodiments.

Some modifications can be performed automatically. FIG. 9 is a high-level flowchart illustrating various methods and techniques for performing automated caching modifications, according to some embodiments. As indicated at 910, a modification to caching for requests and responses among different services may be identified for consideration of automated performance, in some embodiments. For example, a user may request performance of the modification, in some embodiments. In some embodiments, a recommendation generated by a caching evaluation system may be received.

As indicated at 920, a determination may be made as to whether the type of modification can be automatically performed. In some embodiments, automatic modification types may be determined by those actions to implement the modification supported by a service remotely (e.g., via request to control plane or service component). For example, caching policy changes may be supported via control plane requests, so a cache policy modification may be an automatic type. For non-automatic modification types, a recommendation to perform modification may be sent, as indicated at 922. In some embodiments, other validation techniques for modifications may be implemented to determine whether or not a modification can be automatically performed (or provided as discussed above). For example, protected or key words may not be subject to automatic modification or user-specified modification limits (e.g., cache size can be increased up to X size) may be considered, in some embodiments.

As indicated at 930, for automatic modifications, whether permission has been granted to perform the automatic modification may be determined, in some embodiments. For example, permission may be implicitly granted if the initial modification request is received from a user with authority to make the request, as discussed at 910. In some embodiments, permission may be requested, as indicated at 932, if not determined to be granted. For instance, a user interface, notification, or other interface may support permission requests (and answers), in some embodiments. When permission is granted, then as indicated at 940, the modification to caching for requests and responses among the different services may be instructed, in some embodiments. For example, an interface, control, or other protocol to submit the instructions to the service being modified may be utilized to describe the modification to perform.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
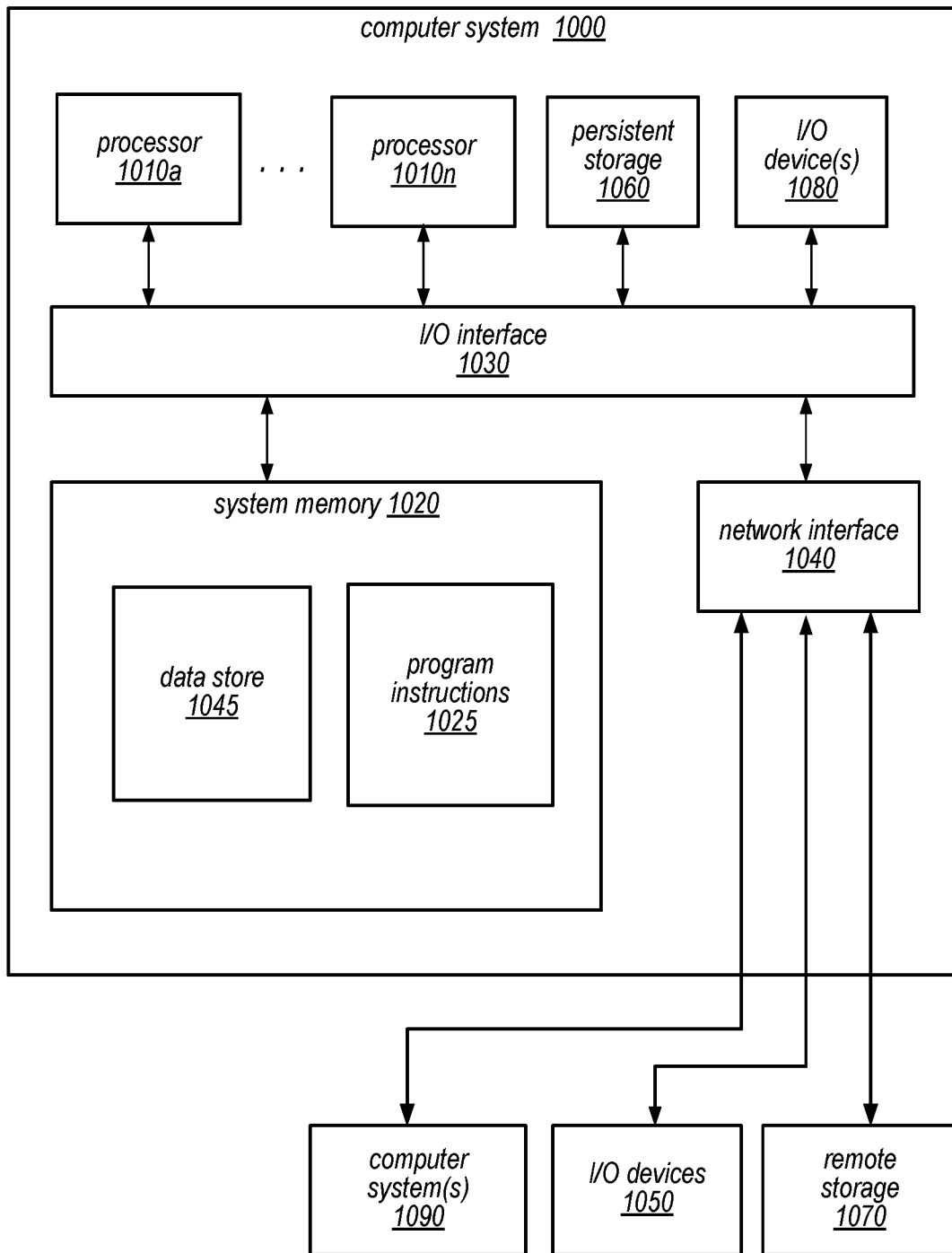
FIG. 10 is a block diagram illustrating an example computing system, according to some embodiments.

Embodiments of determining a modification to caching amongst services from a history of requests and responses may be executed on one or more computer systems, which may interact with various other devices. FIG. 10 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the cache evaluation system, in different embodiments. In some embodiments, program instructions 1025 may implement multiple service components, clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a caching analysis system, the caching analysis system configured to:
   receive, via an interface for the caching analysis system, a request to evaluate caching from a log that describes a plurality of Application Programming Interface (API) requests and responses exchanged between a plurality of different services that implement an open content model, wherein caching to perform at least a portion of the API requests and responses is implemented among the different services at one or more of the different services; and
   responsive to the request:
   scan the log of API requests and responses exchanged between the plurality of different services to determine respective frequencies of parameters included in the API requests and responses;
   evaluate respective effects of one or more possible changes to the caching on the respective frequencies of parameters to identify one or more modifications to the parameters of one or more of the API requests and response to increase utilization of the caching among the different services; and
   provide, via the interface, the one or more modifications to the parameters of one or more of the API requests and responses to increase utilization of the caching among the different services.

2. The system of claim 1, wherein one of the modifications to the parameters identifies one or more additional parameters to replace one of the parameters.

3. The system of claim 1, wherein the request to evaluate caching is sent responsive to detecting that the descriptions of the API requests and responses exchanged between the plurality of different services are stored in the log.

4. The system of claim 1, wherein the interface is a graphical user interface (GUI), wherein the one or more modifications to the parameters indicate a current cache utilization for the parameters and a possible cache increase utilization with the modifications.

5. A method, comprising:
   receiving, via an interface, a request to evaluate caching from a history of a plurality of requests and responses comprising Application Programming Interface (API) requests and responses exchanged between a plurality of different services, wherein caching to perform at least a portion of the API requests and responses is implemented among the different services at one or more of the different services;
   determining respective frequencies of parameters included in the API requests and responses;
   evaluating respective effects of one or more possible changes to caching on the respective frequencies of parameters to determine one or more modifications to the caching among the different services; and
   providing, via the interface, the one or more modifications to the caching among the different services to change caching performance of subsequent requests and responses exchanged between the different services.

6. The method of claim 5, further comprising:
   receiving, via the interface, permission to perform one of the modifications to the caching among the different services; and
   responsive to receiving the permission, causing performance of the one modification to the caching among the different services.

7. The method of claim 5, wherein at least one of the modifications to the caching comprises adding a new cache among the different services.

8. The method of claim 5, wherein at least one of the modifications to the caching comprises changing a configuration of an existing cache at one of the one or more services.

9. The method of claim 5, wherein at least one of the modifications to the caching comprises identifying one of the parameters to remove from the requests and the responses to reduce a miss rate for the caching.

10. The method of claim 9, wherein a further one of the modifications comprises identifying one or more replacement parameters for the one parameter to remove.

11. The method of claim 5, wherein at least one of the modifications to the caching comprises replacing an existing cache at one of the one or more services with two or more new caches, wherein one of the new caches is located separate from the other one of the new caches.

12. The method of claim 5, further comprising transforming a nested version of the history of the plurality of requests and responses exchanged between the plurality of different services into a non-nested format before determining the respective frequencies of the parameters.

13. The method of claim 5, further comprising:
   automatically causing performance of one of the one or more modifications to the caching according to a determined type of the one modification.

14. One or more non-transitory, computer-readable storage media, storing program instructions that when executed on or across one or more computing devices cause the one or more computing devices to implement:
   receiving, via an interface, a request to evaluate caching from a history of a plurality of requests and responses comprising Application Programming Interface (API) requests and responses exchanged between a plurality of different services, wherein caching to perform at least a portion of the API requests and responses is implemented among the different services at one or more of the different services;
   responsive to the request:
   accessing the history of the plurality of API requests and responses exchanged between the plurality of different services to determine respective frequencies of parameters included in the API requests and responses;
   evaluating the respective frequencies of parameters to determine one or more modifications to the caching among the different services; and
   providing, via the interface, the one or more modifications to the caching among the different services to change caching performance of subsequent requests and responses exchanged between the different services.

15. The one or more non-transitory, computer-readable storage media of claim 14, storing further instructions that when executed on or across the one or more computing devices, cause the one or more computing devices to further implement:
   receiving, via the interface, permission to perform one of the modifications to the caching among the different services; and responsive to receiving the permission, causing performance of the one modification to the caching among the different services.

16. The one or more non-transitory, computer-readable storage media of claim 14, wherein at least one of the modifications to the caching comprises adding a new cache among the different services.

17. The one or more non-transitory, computer-readable storage media of claim 14, wherein the evaluating the respective frequencies includes evaluating respective effects of one or more possible changes to the caching specified in the request to evaluate the caching or specified in another request.

18. The one or more non-transitory, computer-readable storage media of claim 14, wherein the one or more modifications to the parameters indicate a current cache utilization for the parameters and a possible cache increase utilization with the modifications.

19. The one or more non-transitory, computer-readable storage media of claim 14, storing further instructions that when executed on or across the one or more computing devices, cause the one or more computing devices to further implement:
  automatically causing performance of one of the one or more modifications to the caching according to a determined type of the one modification.

20. The one or more non-transitory, computer-readable storage media of claim 14, wherein the request to evaluate caching is sent responsive to detecting that the history of plurality of requests and responses exchanged between a plurality of different services is recorded.

\* \* \* \* \*